(12) United States Patent
Ong et al.

(10) Patent No.: US 8,432,909 B2
(45) Date of Patent: Apr. 30, 2013

(54) METHODS AND SYSTEMS FOR USING A LINK MANAGEMENT INTERFACE TO DISTRIBUTE INFORMATION IN A COMMUNICATIONS NETWORK

(75) Inventors: Lyndon Y. Ong, Sunnyvale, CA (US); Sandeep Bhat, Mountain View, CA (US)

(73) Assignee: Ciena Corporation, Hanover, MD (US)

( * ) Notice: Subject to any disclaimer, the term of this patent is extended or adjusted under 35 U.S.C. 154(b) by 816 days.

(21) Appl. No.: 11/732,305

(22) Filed: Apr. 3, 2007

(65) Prior Publication Data

US 2008/0247393 A1    Oct. 9, 2008

(51) Int. Cl.
*H04L 12/28* (2006.01)
*H04L 12/56* (2006.01)

(52) U.S. Cl.
USPC .......................................... 370/392; 370/401

(58) Field of Classification Search .................. None
See application file for complete search history.

(56) References Cited

U.S. PATENT DOCUMENTS

| | | | | |
|---|---|---|---|---|
| 2003/0069988 A1* | 4/2003 | Rune et al. | ..................... | 709/237 |
| 2003/0212821 A1* | 11/2003 | Gillies et al. | .................. | 709/238 |
| 2004/0218923 A1* | 11/2004 | Ozugur et al. | .................. | 398/57 |
| 2005/0108376 A1* | 5/2005 | Deval et al. | ..................... | 709/223 |
| 2007/0074039 A1* | 3/2007 | Li | ................................ | 713/182 |

OTHER PUBLICATIONS

Jordi Perello et al, "Control Plane Protection Using Link Management Protocol (LMP) in the ASON/GMPLS Carisma Network," Apr. 27, 2006, F. Boavida et al. (Eds.): Networking 2006, LNCS 3976, pp. 1182-1190.*
Soumiya et al., "Extensions to LMP for Flooding-based Fault Notification", Dec. 2003, draft-soumiya-lmp-fault-notification-ext-02, IETF.*
Perello et al., "Control Plane Protection Using Link Management Protocol (LMP) in the ASON/GMPLS Carisma Network", Apr. 27, 2006, Networking'06 Proceedings of the 5th international IFIP-TC6 conference on Networking Technologies, Services, and Protocols; Performance of Computer and Communication Networks; Mobile and Wireless Communications Systems.*

* cited by examiner

*Primary Examiner* — Jae Y Lee
(74) *Attorney, Agent, or Firm* — Clements Bernard PLLC; Christopher L. Bernard; Lawrence A. Baratta, Jr.

(57) ABSTRACT

In various exemplary embodiments, the present invention provides a low-cost, low-processing overhead mechanism for distributing routing, topology, reachability, and recovery information across the interface between two nodes that may then be used by a network or client device to populate a topology database, route a connection, recover from a connection failure, etc. Specifically, the methods and systems of the present invention use a link management interface and the associated link management protocol(s) to distribute this routing, topology, reachability, and recovery information, adding it to the normal link management protocol(s).

27 Claims, 13 Drawing Sheets

METHODS AND SYSTEMS FOR USING A LINK MANAGEMENT INTERFACE TO DISTRIBUTE INFORMATION IN A COMMUNICATIONS NETWORK

FIELD OF THE INVENTION

The present invention relates generally to methods and systems for using a link management interface to distribute information in a communications network. More specifically, the present invention relates to methods and systems for using a link management interface to distribute routing, topology, reachability, and recovery information in an optical communications network.

BACKGROUND OF THE INVENTION

The distribution of routing, topology, reachability, and recovery information from one node of an optical communications network to another is a requirement for automated network provisioning and management. In generalized multi-protocol label switching (GMPLS) optical networks and automatically-switched optical networks (ASONs), this distribution is performed using a routing protocol, such as the open shortest path first (OSPF) routing protocol. Such routing protocols, however, have high overhead requirements and are used to distribute full topology information across the interface between two nodes. Typically, this is not desirable and adds significant development, implementation, and processing costs.

Thus, what is still needed in the art is a low-cost, low-processing overhead mechanism for distributing routing, topology, reachability, and recovery information across the interface between two nodes that may then be used by a network or client device to populate a topology database, route a connection, recover from a connection failure, etc.

BRIEF SUMMARY OF THE INVENTION

In various exemplary embodiments, the present invention provides a low-cost, low-processing overhead mechanism for distributing routing, topology, reachability, and recovery information across the interface between two nodes that may then be used by a network or client device to populate a topology database, route a connection, recover from a connection failure, etc. Specifically, the methods and systems of the present invention use a link management interface and the associated link management protocol(s) to distribute this routing, topology, reachability, and recovery information, adding it to the normal link management protocol(s).

In one exemplary embodiment, the present invention provides a method for using a link management interface to distribute routing, topology, reachability, and recovery information in a communications network, including: given a link management protocol message configured for exchange over a local link management interface, adding one or more extension fields to the link management protocol message, the one or more extension fields related to one or more of routing, topology, reachability, and recovery information; and exchanging the link management protocol message and the one or more extension fields between neighboring nodes over the local link management interface. Optionally, the neighboring nodes include border nodes associated with two neighboring networks. Optionally, the neighboring nodes include border nodes associated with two neighboring sub-networks. Optionally, the neighboring nodes comprise a transport network element and a client device that are directly connected by a control link. Optionally, the routing, topology, reachability, and recovery information includes topology information used for path computation including one or more of least-cost path computation, optimal entry point computation, and failure circumvention computation. Optionally, the routing, topology, reachability, and recovery information includes reachability information including client addresses reachable across a given link. The use of the link management protocol message including the one or more extension fields obviates the need for using full routing protocol messages. The use of the link management protocol message including the one or more extension fields includes initializing the link management protocol and thereafter exchanging periodic "hello" messages to verify that link connectivity is still available.

In another exemplary embodiment, the present invention provides a method for using a link management interface to distribute routing, topology, reachability, and recovery information in a communications network, including: given a link management protocol message configured for exchange over a local link management interface, adding one or more extension fields to the link management protocol message, the one or more extension fields related to one or more of routing, topology, reachability, and recovery information; and exchanging the link management protocol message and the one or more extension fields between neighboring nodes over the local link management interface; wherein the one or more extension fields comprise additional parameters that are exchanged during configuration by extending an object class name space associated with the one or more extension fields, the link management protocol message built using objects, each object identified by a class and a class type. Optionally, the neighboring nodes include border nodes associated with two neighboring networks. Optionally, the neighboring nodes include border nodes associated with two neighboring sub-networks. Optionally, the neighboring nodes comprise a transport network element and a client device that are directly connected by a control link. Optionally, the routing, topology, reachability, and recovery information includes topology information used for path computation including one or more of least-cost path computation, optimal entry point computation, and failure circumvention computation. Optionally, the routing, topology, reachability, and recovery information includes reachability information including client addresses reachable across a given link. The use of the link management protocol message including the one or more extension fields obviates the need for using full routing protocol messages. The use of the link management protocol message including the one or more extension fields includes initializing the link management protocol and thereafter exchanging periodic "hello" messages to verify that link connectivity is still available.

In a further exemplary embodiment, the present invention provides a system for using a link management interface to distribute routing, topology, reachability, and recovery information in a communications network, including: a link management protocol message configured for exchange over a local link management interface including one or more extension fields to the link management protocol message, the one or more extension fields related to one or more of routing, topology, reachability, and recovery information; and means for exchanging the link management protocol message and the one or more extension fields between neighboring nodes over the local link management interface. Optionally, the neighboring nodes include border nodes associated with two neighboring networks. Optionally, the neighboring nodes include border nodes associated with two neighboring sub-networks. Optionally, the neighboring nodes comprise a transport network element and a client device that are directly connected by a control link. Optionally, the routing, topology, reachability, and recovery information includes topology information used for path computation including one or more of least-cost path computation, optimal entry point computation, and failure circumvention computation. Optionally, the routing, topology, reachability, and recovery information includes reachability information including client addresses reachable across a given link. The use of the link management protocol message including the one or more extension fields obviates the need for using full routing protocol messages. The use of the link management protocol message including the one or more extension fields includes initializing the link management protocol and thereafter exchanging periodic "hello" messages to verify that link connectivity is still available.

BRIEF DESCRIPTION OF THE DRAWINGS

The present invention is illustrated and described herein with reference to the various drawings, in which like reference numbers are used to denote like method steps and/or system components, as appropriate, and in which.

DETAILED DESCRIPTION OF THE INVENTION

A link management interface involves the simple exchange of messages between two adjacent nodes. Typical link management functions include the exchange of link management protocol configurations, link characteristics (size, signal type, aggregation, etc.), and keep-alive information, as described in the link management protocol (LMP). The present invention provides for the addition of fields to these messages to carry routing, topology, reachability, and recovery information in the domains or networks at either end of a given link, when the link is between two border nodes, for example.

For the routing of control messages, using either an in-band control channel or an out-of-band control network, routing information used to map addresses to nodes is exchanged over a local link management interface using extension fields added to the normal link management messages. Examples of addressing and routing information include target/terminal identification (TID) tables for transaction language 1 (TL1) message routing.

For the simple distribution of topology information to aid in path computation and the like, topology information, such as nodes and nodes identifications, is also exchanged over the local link management interface using extension fields added to the normal link management messages. Examples of topology information include, for rings closed on a core optical network, a list of the ring members in order and an indication that the topology is a ring. This topology information may be used to calculate the cost to reach a given ring member, thus allowing the selection of an optimal entry point to the ring. This topology information may also be used to handle failure cases in which the ring is segmented, by changing the list of ring members that may be reached.

For the distribution of client reachability information, client addresses, such as optical network transport network assigned addresses (TNAs), reachable across a given link, are exchanged using extension fields added to the normal link management messages. This allows for path computation to a client without the use of a full routing protocol.

Figure 1:
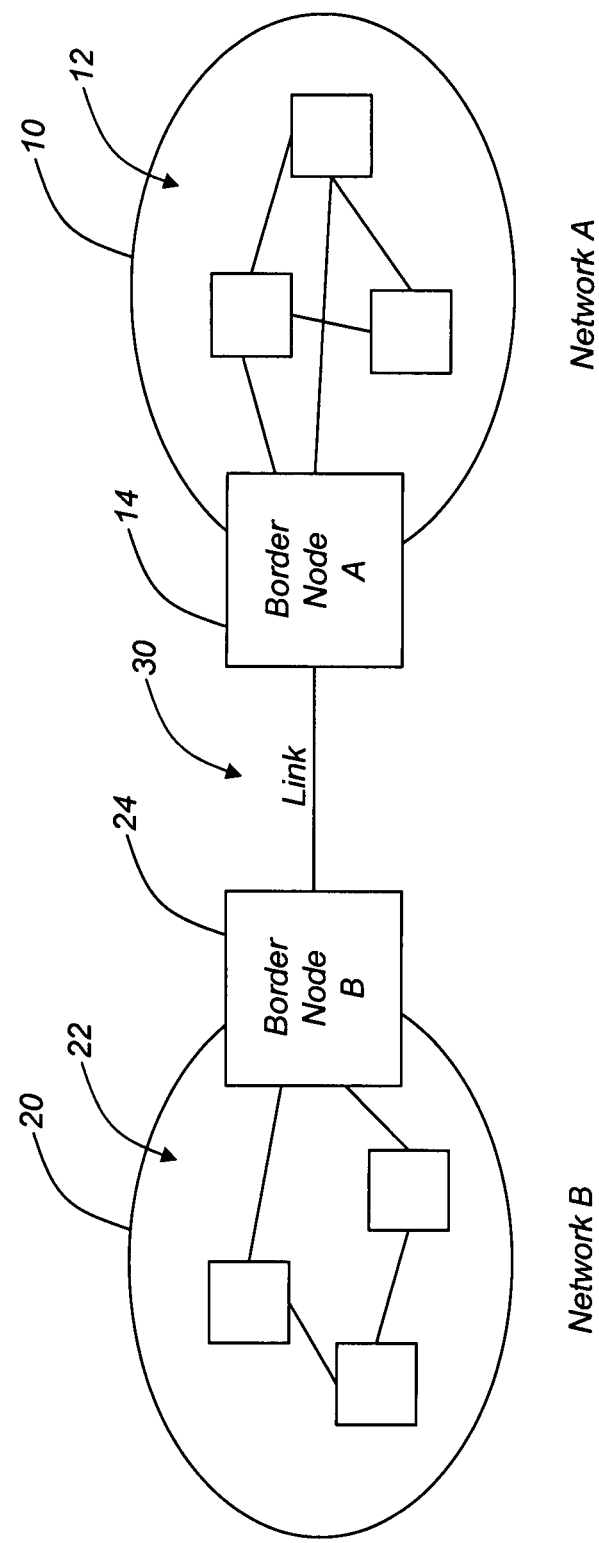
FIG. 1 is a schematic diagram illustrating two domains or networks including two border nodes that are joined by a link, the options for a control plane interface between the two domains or networks including using a full routing protocol, such as OSPF, or using LMP with extensions in accordance with the methods and systems of the present invention, LMP with extensions conveying a subset of information with significantly less complexity and processing required.

FIG. 1 is a schematic diagram illustrating two domains or networks, network A 10 and network B 20, including a plurality of nodes 12, 22 and two border nodes, border node A 14 and border node B 24, that are joined by a link 30, the options for a control plane interface between the two domains or networks including using a full routing protocol, such as OSPF, or using LMP with extensions in accordance with the methods and systems of the present invention, LMP with extensions conveying a subset of information with significantly less complexity and processing required.

Figure 2:
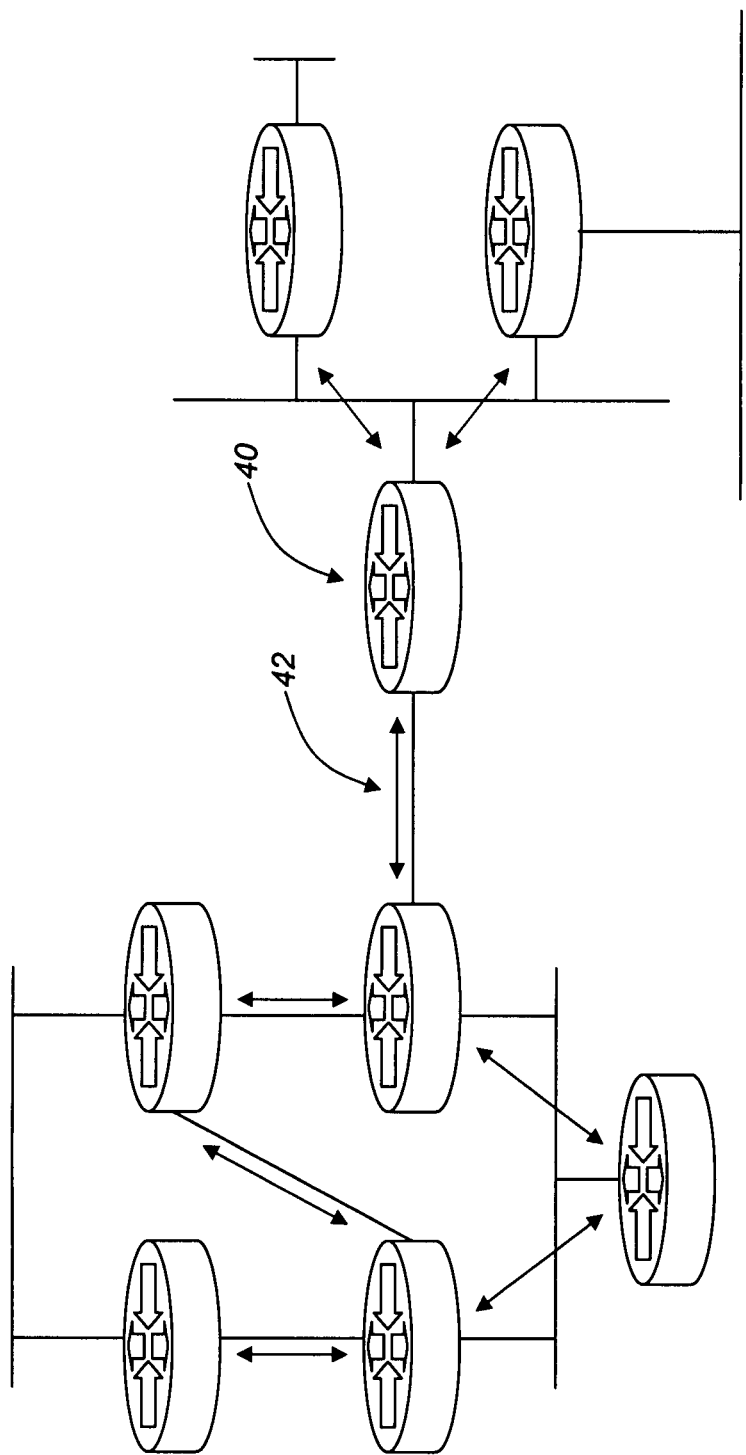
FIG. 2 is a schematic diagram illustrating the routers in a router network establishing adjacency by the exchange of OSPF "hello" messages in order to verify connectivity for the exchange of routing protocol messages—thereby illustrating the use of a routing protocol.

FIG. 2 is a schematic diagram illustrating the routers 40 in a router network establishing adjacency by the exchange of OSPF "hello" messages 42 in order to verify connectivity for the exchange of routing protocol messages. Thereafter, OSPF "hello" messages 42 are periodically exchanged in order to maintain adjacency and determine if there has been a loss of connectivity due to, for example, a router or link failure. Thus, OSPF is used to exchange routing, topology, reachability, and recovery information.

Figure 3:
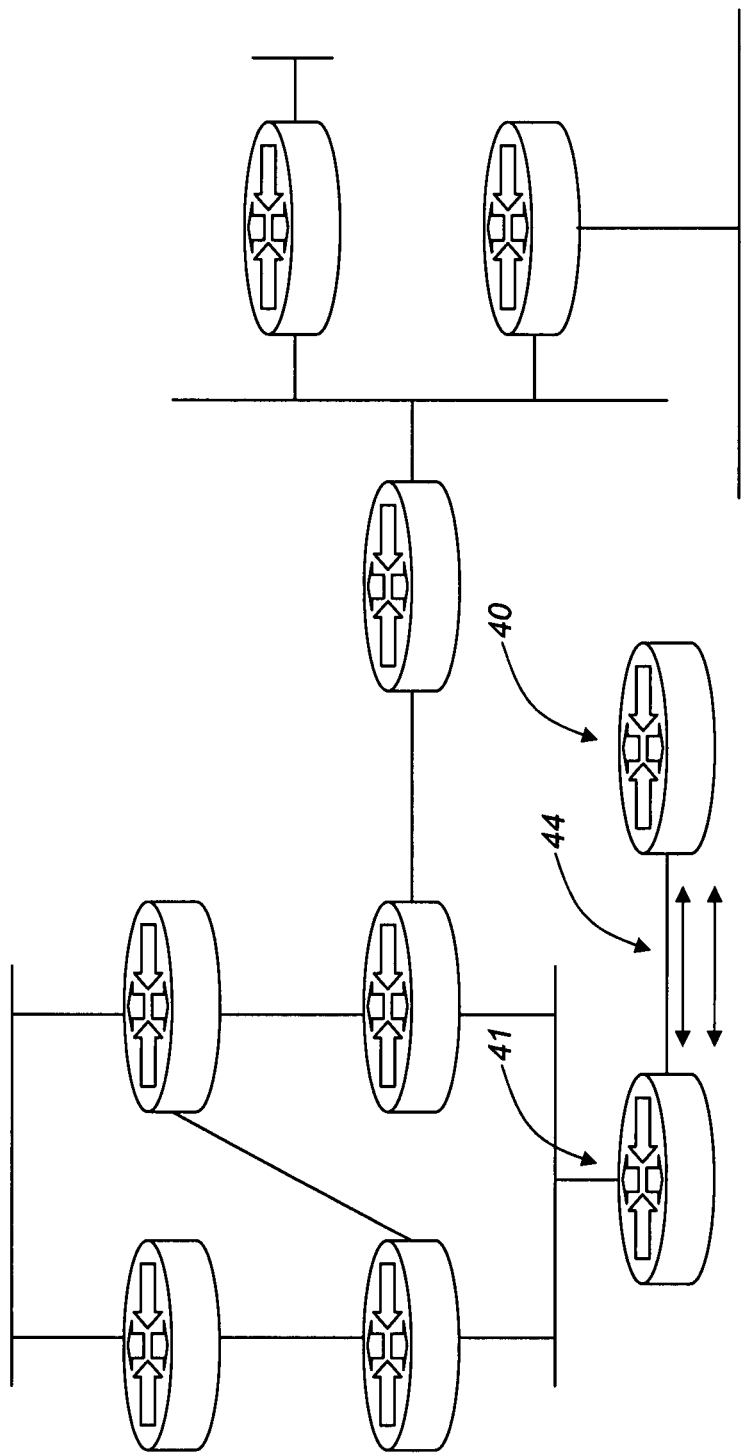
FIG. 3 is a schematic diagram illustrating a router that needs to build its routing topology database (because it has just been added to a network, or because it has just recovered from a failure that caused the loss of its routing topology database, for example) and has established adjacency with a neighboring router requesting an update to its routing topology database in order to restore routing topology information—thereby illustrating the use of a routing protocol.

FIG. 3 is a schematic diagram illustrating a router 40 that needs to build its routing topology database (because it has just been added to a network, or because it has just recovered from a failure that caused the loss of its routing topology database, for example) and has established adjacency with a neighboring router 41 requesting an update to its routing topology database in order to restore routing topology information. The neighboring router 41 sends all of the stored link and node advertisements in its database via a local database synchronization message 44 in order to synchronize the contents of its database with that of the requesting router 40.

Figure 4:
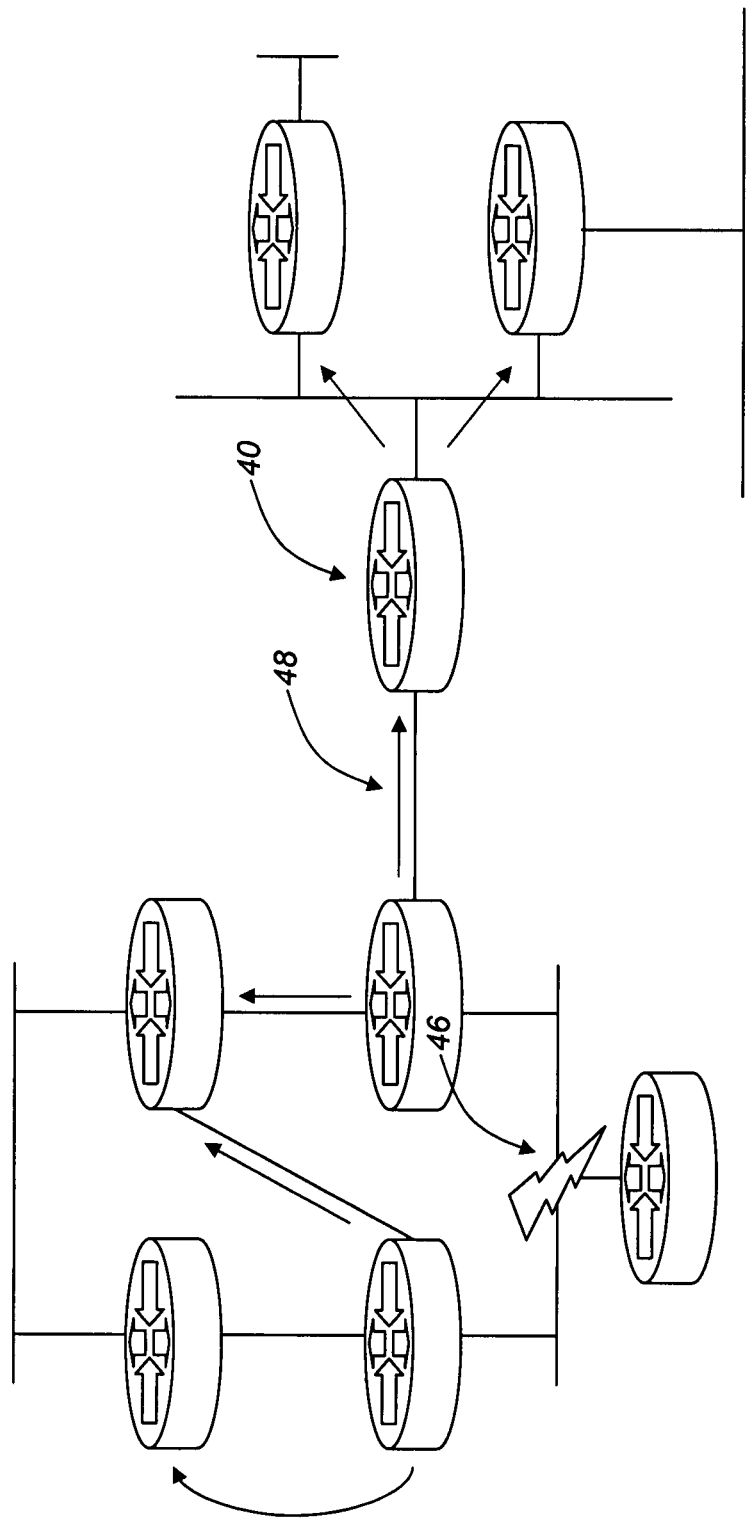
FIG. 4 is a schematic diagram illustrating the failure of a link or node as reflected in a plurality of link-state updates that are reliably distributed to each router in the network using a "controlled flooding" approach—thereby illustrating the use of a routing protocol.

FIG. 4 is a schematic diagram illustrating the failure of a link or node 46 as reflected in a plurality of link-state updates 48 that are reliably distributed to each router 40 in the network using a "controlled flooding" approach. In accordance with this approach, the node that detects the failure 46 sends out the link-state update message 48 indicating that the failure 46 has occurred. Nodes that subsequently receive the link-state update message 48 compare it to their current routing topology database, and if the two differ, use the link-state update message 48 to synchronize their routing topology database. Such nodes then forward the link-state update message 48 to all neighboring nodes, with the exception of the node that originally sent the link-state update message 48. Once the routing topology databases are updated, no further "flooding" in necessary.

As illustrated and described above, the processing requirements associated with full routing protocols are quite high and subject to spikes during database synchronization and failure notification due to the inherent nature of the synchronization and "flooding" processes.

Figure 5:
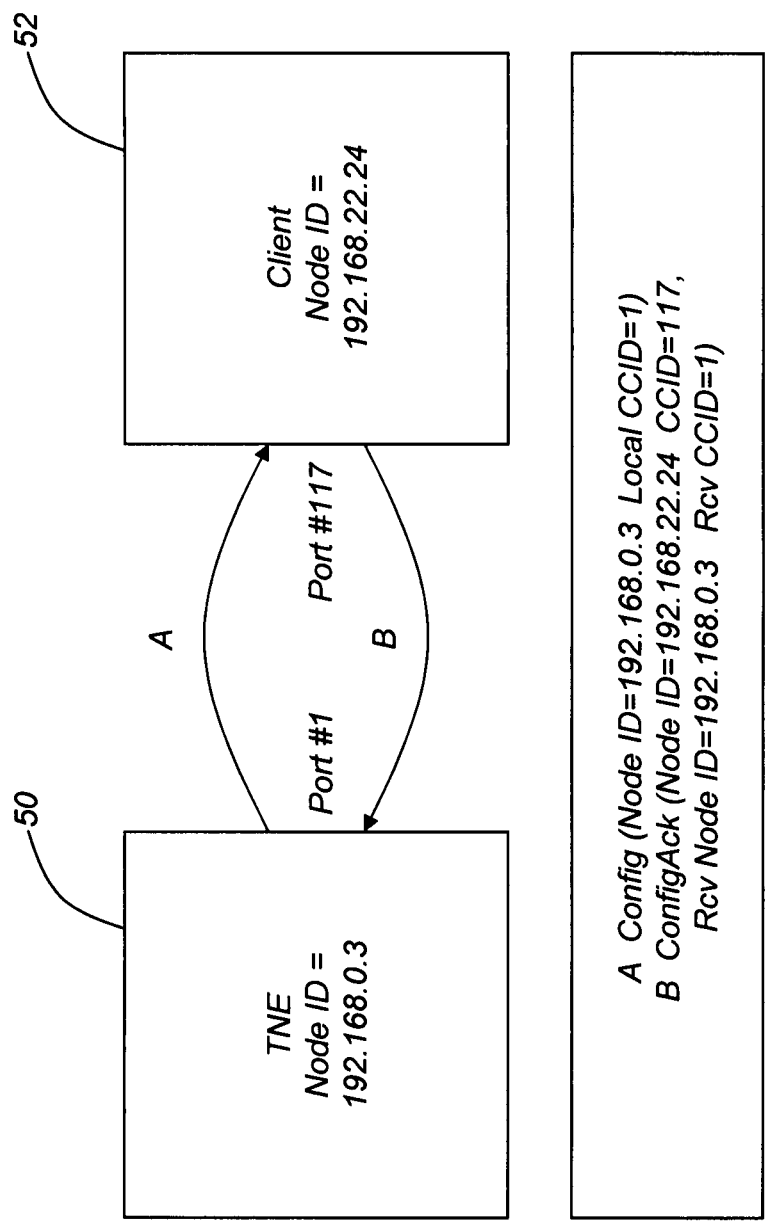
FIG. 5 is a schematic diagram illustrating the use of LMP between two adjacent nodes in accordance with the methods and systems of the present invention (it should be noted that, although "TNE" and "Client" nodes are illustrated, both nodes could be "TNE" nodes, for example)

FIG. 5 is a schematic diagram illustrating the use of LMP between two adjacent nodes 50, 52 in accordance with the methods and systems of the present invention. There is no immediate requirement related to the establishment and/or maintenance of adjacency to other nodes, no immediate requirement related to the synchronization of a database, and no immediate requirement related to the "flooding" of advertisements. Link management requires only that the two adjacent nodes 50, 52 initialize the LMP and thereafter exchange periodic "hellos" to verify that link connectivity is still available.

Figure 6:
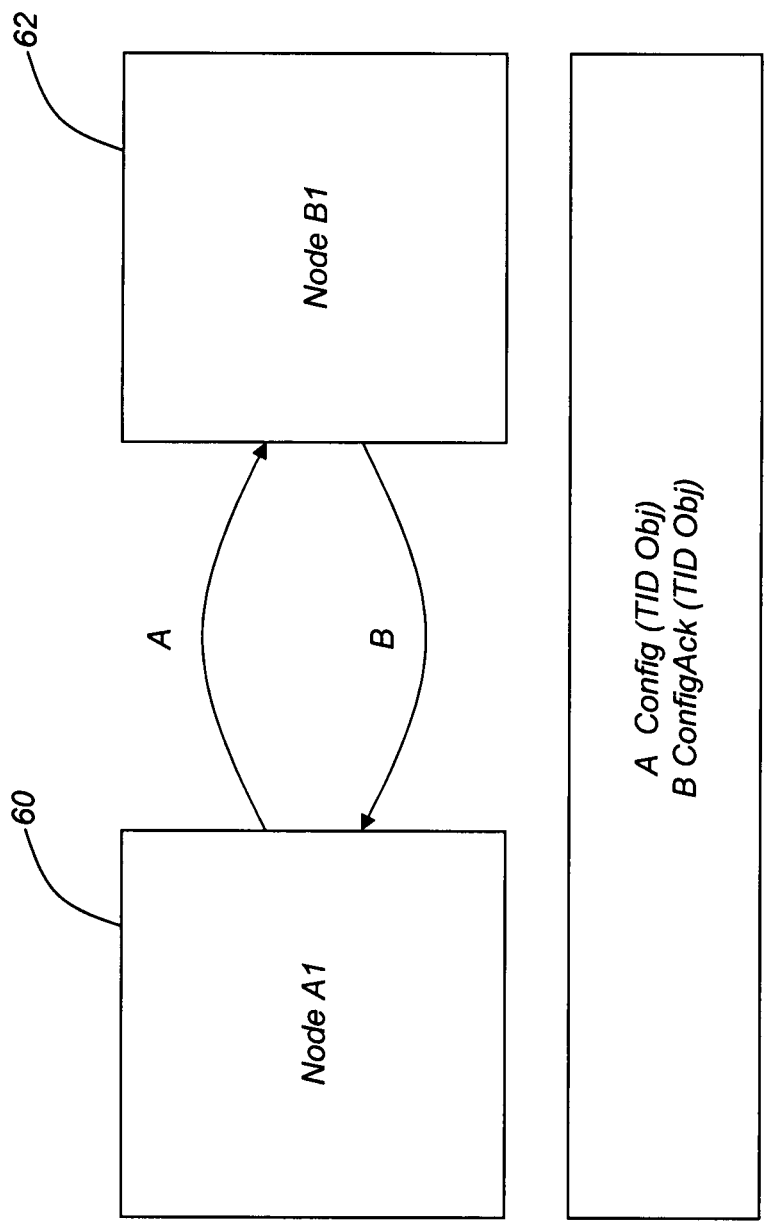
FIG. 6 is a schematic diagram illustrating the exchange of addressing (routing, topology, etc.) information between two nodes using link management messages.

FIG. 6 is a schematic diagram illustrating the exchange of routing information between two nodes 60, 62 using link management messages. This same exchange may be applied to border nodes associated with two connected networks, border nodes associated with two connected sub-networks or domains, or a transport network element (TNE) and a client device that are directly connected by a control link. In order to enhance the functionality of the methods and systems of the present invention, extensions are made to LMP that permit the identification of a neighboring node. These additional parameters (TID and node type) are exchanged during configuration by extending the object class name space. LMP messages are built using objects, and each object is identified by a class and a class type (C-Type). The format for the LMP Object TLV header is illustrated in Table 1 below.

TABLE 1

LMP Object TLV

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| N | C-Type | | | | | | | | Class | | | | | | | | | Length | | | | | | | | | | | | | |
| TLV | | | | | | | | | | | | | | | | | | | | | | | | | | | | | | | |

Each object is either negotiable or non-negotiable (as identified by the N bit). Negotiable objects (N=1) may be used to allow LMP peers to agree on certain values. Non-negotiable objects (N=0) may be used for the announcement of specific values that do not require, or do not allow, negotiation.

LMP divides the name space for object classes into two ranges: classes 0-49, 60-127: LMP-based protocols and classes 50-59: UNI LMP extensions. Because eight bits are available for the object class, values 128-255 may be used to exchange the additional parameters via NDP. Referring to Table 2, Local_TID Class: Class=130, C-Type=1:

TABLE 2

LMP TID Object

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TID | | | | | | | | | | | | | | | | | | | | | | | | | | | | | | | |

TID: (20 bytes). The TID is assigned to the node. The object is non-negotiable.

The special filed NodeType is derived from the NodeID sub-object. It is encoded in the special format illustrated in Table 3 below.

TABLE 3

LMP TID Object TLV

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Ver | | | (Reserved) | | | | | | | | | | | | Bay | | | | Shelf | | | | Slot | | | | | Port | | | |

Ver (3 bits) = 0. Bay (4 bits) = 0 for MD, 1 . . . 12 for CD. Shelf (4 bits) = 0 for MD, 1 . . . 15 for CD. Slot (5 bits) = 0 . . . 31. Port (5 bits) = 0 . . . 31.

Figure 7:
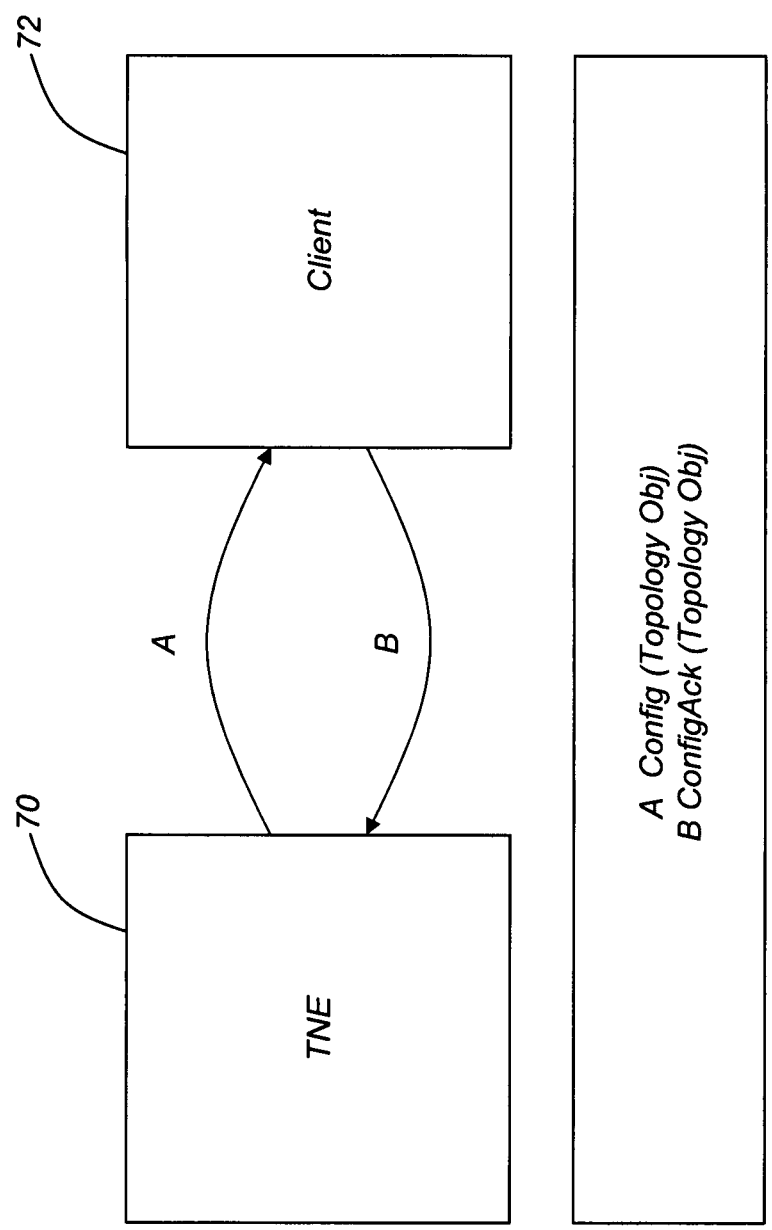
FIG. 7 is a schematic diagram illustrating the exchange of topology information using link management messages.

FIG. 7 is a schematic diagram illustrating the exchange of topology information using link management messages. This same exchange may be applied to border nodes associated with two connected networks, border nodes associated with two connected sub-networks or domains, or a TNE and a client device that are directly connected by a control link. The topology object or objects contain information about the topology of the network behind the TNE or client device. Specifically, the information includes the following: network type: ring, mesh, arbitrary, segmented ring; network nodes: list of node IDs, list of costs or weights between nodes. This information may be updated in subsequent messages if the reachability changes, allowing for the dynamic updating of network status.

Figure 8:
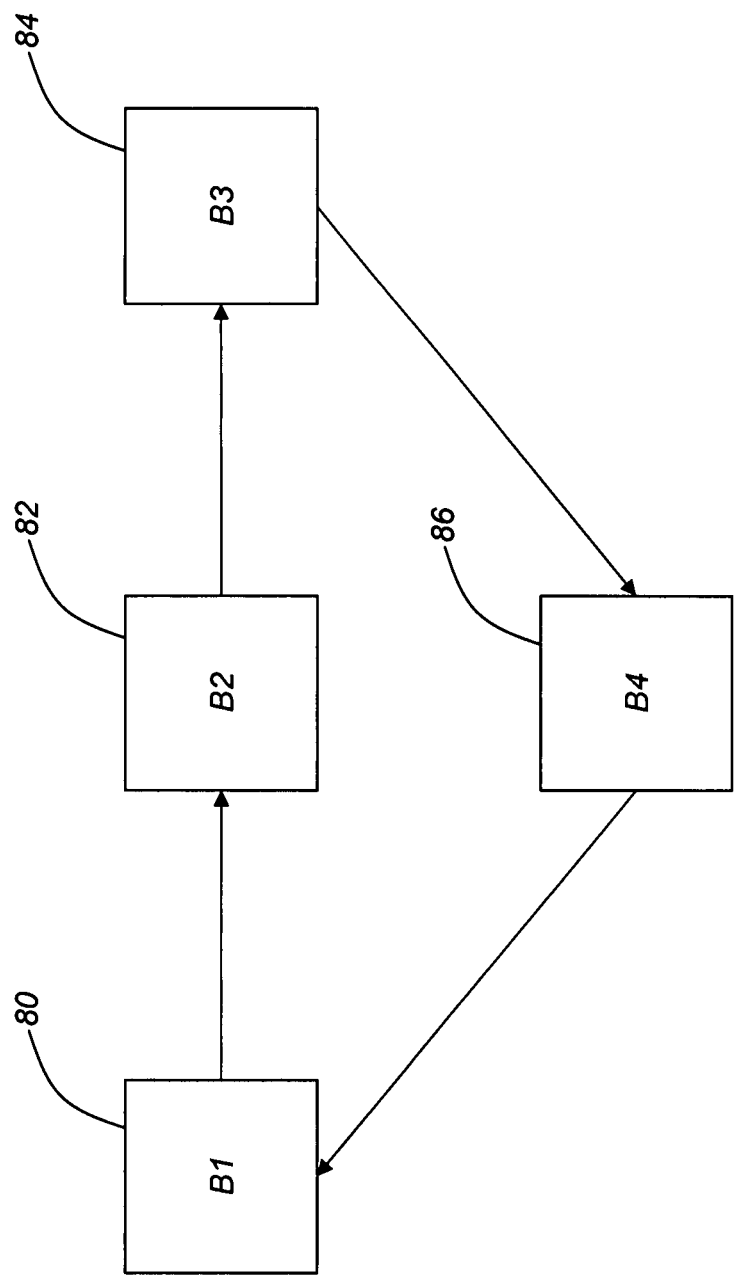
FIG. 8 is a schematic diagram illustrating an example of the advertisement of domain or network topology using the link management messages and extensions of FIG. 7.

FIG. 8 is a schematic diagram illustrating an example of the exchange of topology information using link management messages. Node A1 of network A (not illustrated) receives topology information from node B1 80 of network B that describes the topology of network B as a ring with nodes B1 80, B2 82, B3 84, and B4 86. This may be used for path computation purposes within network A to determine that a path to reach node B4 86 is through border node B1 80, and further that the path sequence B1:B4 is the least-cost path.

Figure 9:
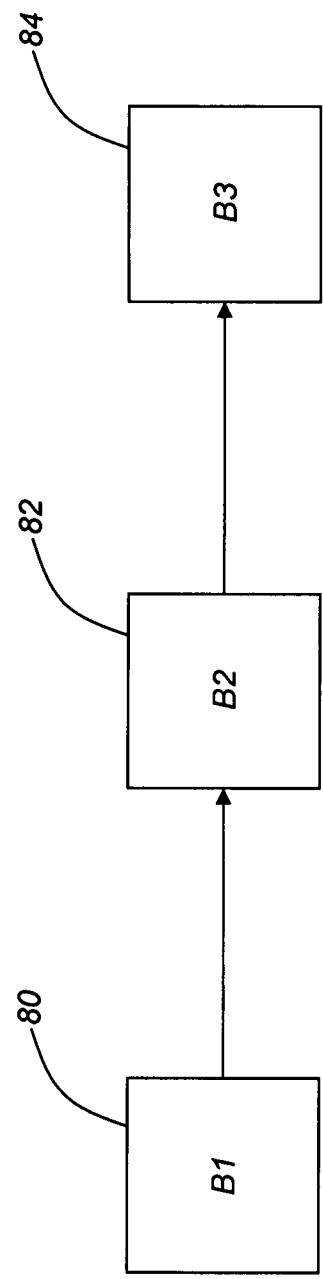
FIG. 9 is a schematic diagram illustrating another example of the advertisement of domain or network topology using the link management messages and extensions of FIG. 7.

FIG. 9 is a schematic diagram illustrating another example of the exchange of topology information using link management messages. After a failure in network B, a revised topology may be given from node B1 80 describing the topology of network B as a segmented ring with nodes B1 80, B2 82, and B3 84. Network A now knows that node B4 86 (FIG. 8) is no longer reachable via the interface between node A1 and node B1 80, however node B3 84 is still reachable, with the shortest path B1:B2:B3.

Figure 10:
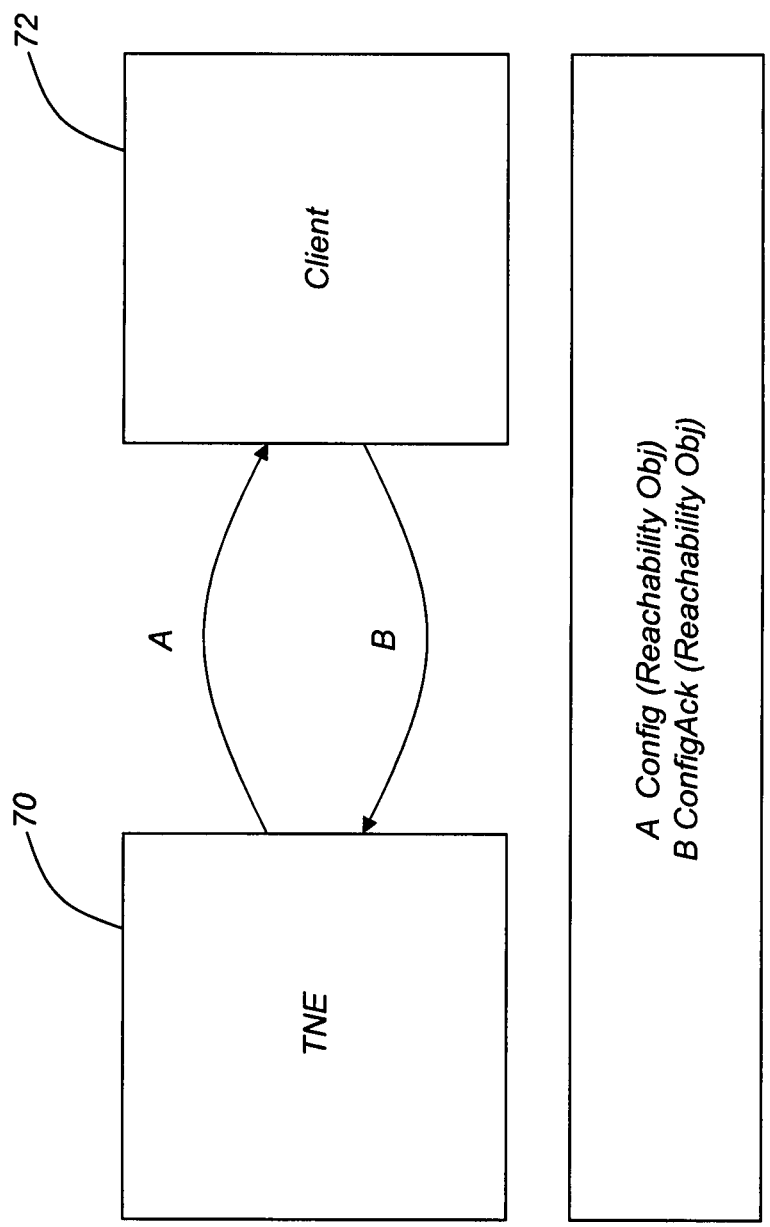
FIG. 10 is a schematic diagram illustrating the exchange of reachability information using link management messages.

FIG. 10 is a schematic diagram illustrating the exchange of reachability information using link management messages. The reachability information conveyed by the reachability object or objects includes the following: contents: list of client addresses reachable through the link. This information may be updated in subsequent messages if the reachability changes, allowing for the dynamic updating of network status.

Figure 11:
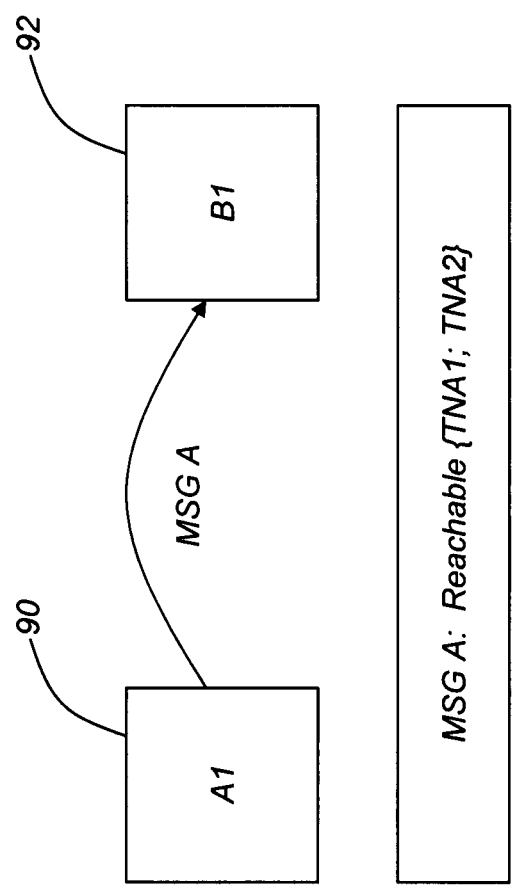
FIG. 11 is a schematic diagram illustrating node A1 exchanging reachability information with node B1 in order to indicate that TNA1 and TNA2 are reachable across the link.

FIG. 11 is a schematic diagram illustrating node A1 90 exchanging reachability information with node B1 92 in order to indicate that TNA1 and TNA2 are reachable across the link. For path computation, the destination client address is what is exchanged across the link and knowledge of the detailed topology is not required. Network B is then able to compute a path to destination client TNA2, at least to the point at which the connection is handed off to node A1 90. Thereafter, if no additional routing information is available, network A performs internal path computation to identify the path to the destination client. If the reachability changes, e.g. TNA2 is isolated from node A1 90, this may be indicated in the reachability information, such that network B knows that the computation of a path to TNA2 through node A1 90 is no longer possible. It should be noted that reachability advertisement differs from topology advertisement in that reachability advertisement identifies that a set of client addresses is reachable through a given link, but does not specify the topology of the network, if there is one, beyond that link. It is possible to support reachability without supporting topology, and it is also possible to support topology without supporting reachability. However, both topology and reachability information are likely to reside on a common topology database.

Figure 12:
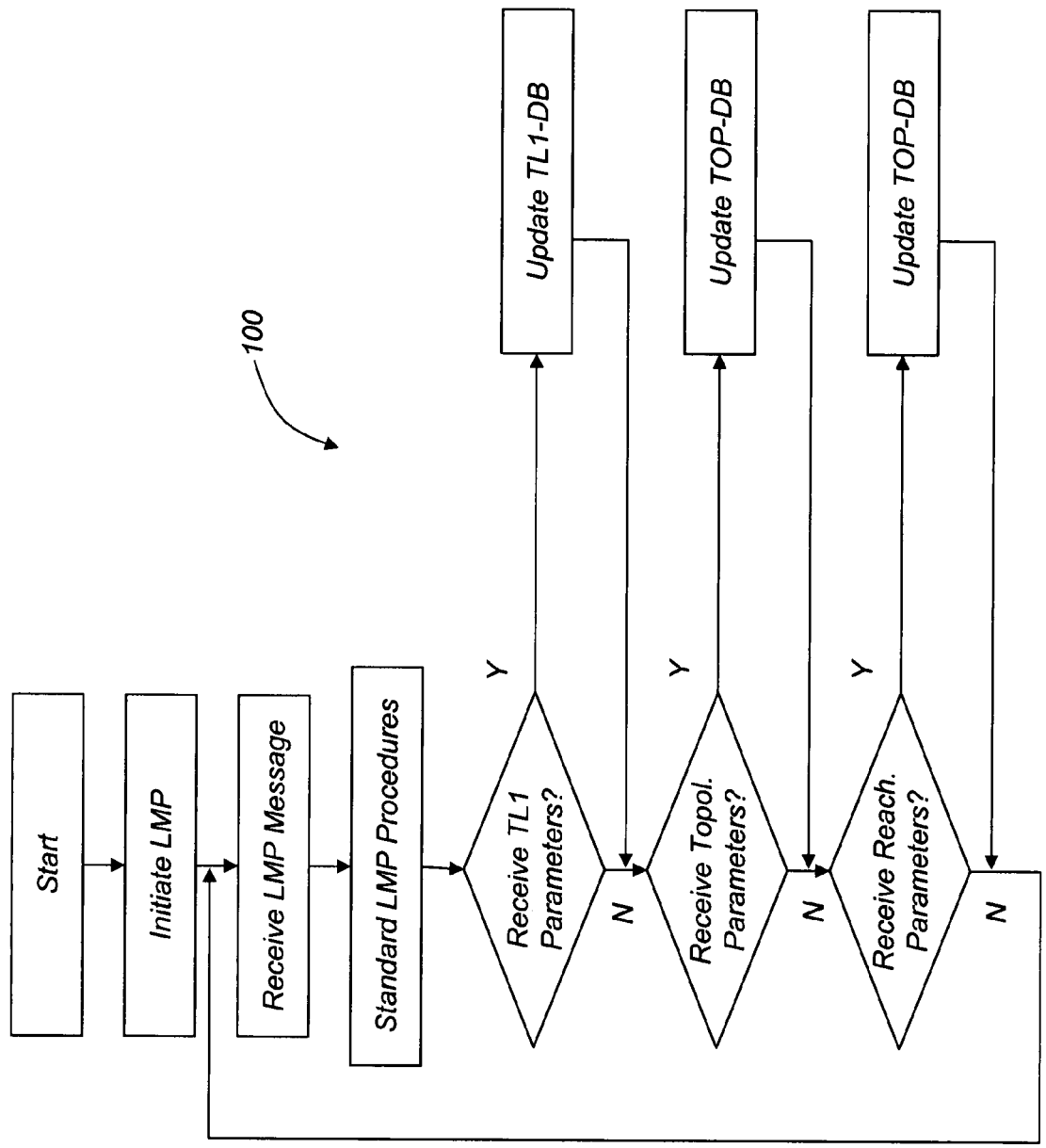
FIG. 12 is a flowchart illustrating a process followed by a single node in exchanging link management messages with its neighbor—in this case, the process followed by the single node upon receiving a link management message from its neighbor.
Figure 13:
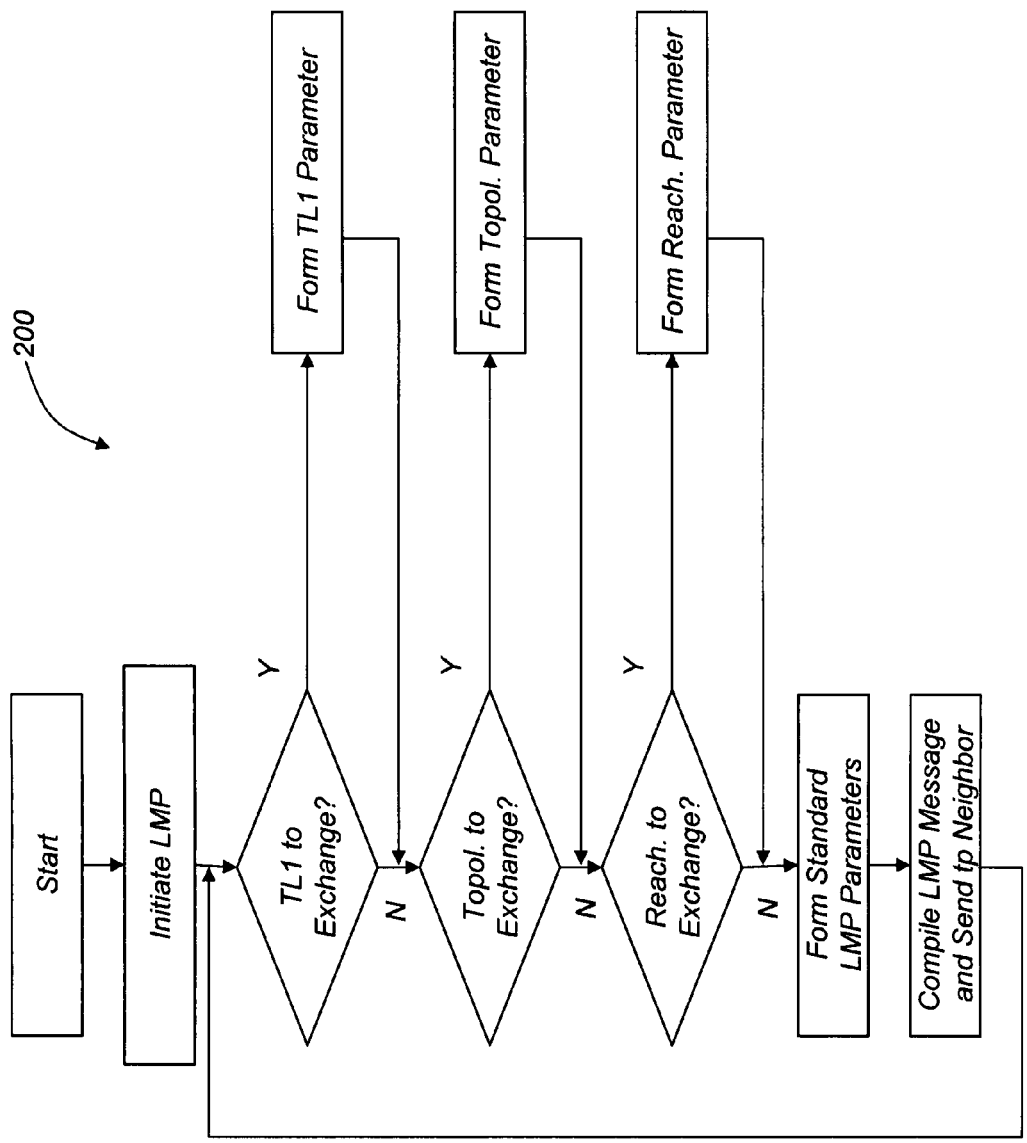
FIG. 13 is a flowchart illustrating another process followed by a single node in exchanging link management messages with its neighbor—in this case, the process followed by the single node in preparation for sending a link management message to its neighbor.

FIG. 12 is a flowchart illustrating a process 100 followed by a single node in exchanging link management messages with its neighbor. FIG. 13 is a flowchart illustrating another process 200 followed by a single node in exchanging link management messages with its neighbor. The entities involved include: the LMP controller (LMP-C); the TL1 routing database (TL1-DB); and the topology database (TOP-DB).

As described above, a full link-state routing protocol or path-vector routing protocol requires considerable overhead for adjacency establishment, keep-alive messaging, and other protocol functions that would otherwise be unnecessary. In addition, routing protocols require that the receiving node flood the received information to any other adjacent nodes in the routing protocol and, as a result, lead to information being disseminated over an unnecessarily wide area, which may be undesirable for privacy/security reasons. LMPs are considerably more simple are only intended to distribute information over the local link. Thus, processing overhead and the cost of implementation are minimized, and the privacy/security of information is maintained.

Advantageously, the methods and systems of the present invention use a simple LMP to distribute information without having to instantiate a more complex and processor-intensive protocol, such as a link-state routing protocol. This link-state routing protocol would require that routing adjacency be established either automatically or by configuration, that routing "hellos" be exchanged to maintain the routing adjacency, that the given node be capable of flooding link-state updates to all adjacent nodes, and that the given node be capable of "database synchronization" with an adjacent node in case either it or the adjacent node suffers a restart.

The use of a local LMP offers the following: reduced processing overhead and software complexity; more simple and smaller messages, thereby reducing the load on the signaling channel; built-in privacy/security protection, as information is only sent on a local link; and simplified representation of information compared to a routing advertisement.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for using a link management interface to distribute routing, topology, reachability, and recovery information in a communications network, comprising:
given a link management protocol message configured for exchange over a local link management interface, adding one or more extension fields to the link management protocol message, the one or more extension fields related to one or more of routing, topology, reachability, and recovery information;
exchanging the link management protocol message and the one or more extension fields between neighboring nodes over the local link management interface such that the routing, topology, reachability, and recovery information is not exchanged between the neighboring nodes via a routing protocol comprising open shortest path first; and
operating the communications network utilizing the link management protocol message for routing, topology, reachability, and recovery information instead of utilizing the routing protocol therefor, wherein the communications network utilizes periodic link management protocol messages between neighboring nodes verifying link connectivity in the communications network without flooding advertisements for routing, topology, reachability, and recovery information;
wherein the link management protocol message is configured to exchange information only over a local link with the one or more extension fields comprising topology information of the communications network including network type, a list of all nodes in the communications network, and costs or weights between the nodes.

2. The method of claim 1, wherein the neighboring nodes comprise border nodes associated with two neighboring networks.

3. The method of claim 1, wherein the neighboring nodes comprise border nodes associated with two neighboring sub-networks.

4. The method of claim 1, wherein the neighboring nodes comprise a transport network element and a client device that are directly connected by a control link.

5. The method of claim 1, wherein exchanging the link management protocol message and the one or more extension fields between neighboring nodes over the local link management interface comprises exchanging the link management protocol message and the one or more extension fields between neighboring nodes over one of an in-band control channel and an out-of-band control network.

6. The method of claim 1, wherein the routing, topology, reachability, and recovery information comprises topology information used for path computation including one or more of least-cost path computation, optimal entry point computation, and failure circumvention computation.

7. The method of claim 1, wherein the routing, topology, reachability, and recovery information comprises reachability information including client addresses reachable across a given link.

8. The method of claim 1, wherein the use of the link management protocol message including the one or more extension fields obviates the need for using full routing protocol messages.

9. The method of claim 1, wherein the use of the link management protocol message including the one or more extension fields comprises initializing the link management protocol and thereafter exchanging periodic "hello" messages to verify that link connectivity is still available.

10. A method for using a link management interface to distribute routing, topology, reachability, and recovery information in a communications network, comprising:
given a link management protocol message configured for exchange over a local link management interface, adding one or more extension fields to the link management protocol message, the one or more extension fields related to one or more of routing, topology, reachability, and recovery information;
exchanging the link management protocol message and the one or more extension fields between neighboring nodes over the local link management interface such that the routing, topology, reachability, and recovery information is not exchanged between the neighboring nodes via a routing protocol comprising open shortest path first; and
operating the communications network utilizing the link management protocol message for routing, topology, reachability, and recovery information instead of utilizing the routing protocol therefor, wherein the communications network utilizes periodic link management protocol messages between neighboring nodes verifying link connectivity in the communications network without flooding advertisements for routing, topology, reachability, and recovery information;
wherein the one or more extension fields comprise additional parameters that are exchanged during configuration by extending an object class name space associated with the one or more extension fields, the link management protocol message built using objects, each object identified by a class and a class type;
wherein the link management protocol message is configured to exchange information only over a local link with the one or more extension fields comprising topology information of the communications network including network type, a list of all nodes in the communications network, and costs or weights between the nodes.

11. The method of claim 10, wherein the neighboring nodes comprise border nodes associated with two neighboring networks.

12. The method of claim 10, wherein the neighboring nodes comprise border nodes associated with two neighboring sub-networks.

13. The method of claim 10, wherein the neighboring nodes comprise a transport network element and a client device that are directly connected by a control link.

14. The method of claim 10, wherein exchanging the link management protocol message and the one or more extension fields between neighboring nodes over the local link management interface comprises exchanging the link management protocol message and the one or more extension fields between neighboring nodes over one of an in-band control channel and an out-of-band control network.

15. The method of claim 10, wherein the routing, topology, reachability, and recovery information comprises topology information used for path computation including one or more of least-cost path computation, optimal entry point computation, and failure circumvention computation.

16. The method of claim 10, wherein the routing, topology, reachability, and recovery information comprises reachability information including client addresses reachable across a given link.

17. The method of claim 10, wherein the use of the link management protocol message including the one or more extension fields obviates the need for using full routing protocol messages.

18. The method of claim 10, wherein the use of the link management protocol message including the one or more extension fields comprises initializing the link management protocol and thereafter exchanging periodic "hello" messages to verify that link connectivity is still available.

19. A system for using a link management interface to distribute routing, topology, reachability, and recovery information in a communications network, comprising:
- a link management protocol message configured for exchange over a local link management interface including one or more extension fields to the link management protocol message, the one or more extension fields related to one or more of routing, topology, reachability, and recovery information; and
- means for exchanging the link management protocol message and the one or more extension fields between neighboring nodes over the local link management interface such that the routing, topology, reachability, and/or and recovery information is not by necessity exchanged between the neighboring nodes via a routing protocol comprising open shortest path first;
- wherein the communications network utilizes the link management protocol message for routing, topology, reachability, and recovery information instead of utilizing the routing protocol therefor, and wherein the communications network utilizes periodic link management protocol messages between neighboring nodes verifying link connectivity in the communications network without flooding advertisements for routing, topology, reachability, and recovery information;
- wherein the link management protocol message is configured to exchange information only over a local link with the one or more extension fields comprising topology information of the communications network including network type, a list of all nodes in the communications network, and costs or weights between the nodes.

20. The system of claim 19, wherein the neighboring nodes comprise border nodes associated with two neighboring networks.

21. The system of claim 19, wherein the neighboring nodes comprise border nodes associated with two neighboring sub-networks.

22. The system of claim 19, wherein the neighboring nodes comprise a transport network element and a client device that are directly connected by a control link.

23. The system of claim 19, wherein the local link management interface comprises one of an in-band control channel and an out-of-band control network.

24. The system of claim 19, wherein the routing, topology, reachability, and recovery information comprises topology information used for path computation including one or more of least-cost path computation, optimal entry point computation, and failure circumvention computation.

25. The system of claim 19, wherein the routing, topology, reachability, and recovery information comprises reachability information including client addresses reachable across a given link.

26. The system of claim 19, wherein the use of the link management protocol message including the one or more extension fields obviates the need for using full routing protocol messages.

27. The system of claim 19, wherein the use of the link management protocol message including the one or more extension fields comprises initializing the link management protocol and thereafter exchanging periodic "hello" messages to verify that link connectivity is still available.

* * * * *